(No Model.) 8 Sheets—Sheet 1.

A. C. NORTH.
TAG MAKING MACHINE.

No. 484,973. Patented Oct. 25, 1892.

Witnesses:
Chas. S. Gifford
Clifford P. White

Inventor:
Alfred C. North
By Dyrenforth & Dyrenforth
Attys (No Model.) 8 Sheets—Sheet 2.

A. C. NORTH.
TAG MAKING MACHINE.

No. 484,973. Patented Oct. 25, 1892.

(No Model.) 8 Sheets—Sheet 3.
A. C. NORTH.
TAG MAKING MACHINE.

No. 484,973. Patented Oct. 25, 1892.

Witnesses: Inventor:
Chas. E. Gaylord Alfred C. North,
Clifford N. White. By Dyrenforth & Dyrenforth
Attys (No Model.) 8 Sheets—Sheet 4.

A. C. NORTH.
TAG MAKING MACHINE.

No. 484,973. Patented Oct. 25, 1892.

Witnesses:
Chas. E. Gaylord
Clifford W. White

Inventor:
Alfred C. North
By Dyrenforth & Dyrenforth
Attys (No Model.)  A. C. NORTH.  8 Sheets—Sheet 5.
TAG MAKING MACHINE.

No. 484,973.  Patented Oct. 25, 1892.

Witnesses:
Chas E Gaylord
Clifford N White

Inventor:
Alfred C. North,
By Dyrenforth & Dyrenforth
Attys (No Model.) 8 Sheets—Sheet 6.

A. C. NORTH.
TAG MAKING MACHINE.

No. 484,973. Patented Oct. 25, 1892.

Witnesses:
Inventor,
Alfred. C. North,
By Dyrenforth & Dyrenforth
Attys.

(No Model.) 8 Sheets—Sheet 7.

A. C. NORTH.
TAG MAKING MACHINE.

No. 484,973. Patented Oct. 25, 1892.

UNITED STATES PATENT OFFICE.

ALFRED C. NORTH, OF BENTON HARBOR, MICHIGAN.

TAG-MAKING MACHINE.

SPECIFICATION forming part of Letters Patent No. 484,973, dated October 25, 1892.

Application filed June 22, 1891. Serial No. 397,133. (No model.)

*To all whom it may concern:*

Be it known that I, ALFRED C. NORTH, a citizen of the United States, residing at Benton Harbor, in the county of Berrien and State of Michigan, have invented a new and useful Improvement in Tag-Making Machines, of which the following is a specification.

My object is to provide a machine of generally-improved construction for use more particularly in the manufacture of paper shipping-tags from a continuous length or web of the material, and while with slight modifications the machine may be adapted to the manufacture of various analogous articles—as, for example, placards, calendar-cards, &c., which it is desirable to provide with reinforced eyes at which to suspend or otherwise secure them—the machine shown in the drawings is designed for turning out tags, and for the sake of convenience the description will be confined thereto.

My object is, further, to combine with the tag-forming mechanism in the machine a printing-press which will operate to print the tags before they are delivered from the machine.

Referring to the drawings.

A is the frame of the machine, comprising the end supports $A'$ and $A^2$, upon which are mounted angle-iron side rails $A^3$ and $A^4$, affording a track for sliding supports, which carry the various relatively-adjustable features of the machine. In bearings on the end supports $A'$ and $A^2$ and extending longitudinally of the machine at one side of the latter is a drive-shaft B.

On the end of the shaft B, near the rear end of the machine, is a friction-disk B'. $B^2$ is a power-shaft in the plane of the shaft B and extending at a right angle to the latter across the rear end of the machine. The shaft $B^2$ is journaled in hangers $z'$ $z^2$, depending from a bar $z$, which is pivotally secured at $z^3$ to a bar $y$, with the under side of which it extends in contact. (See Figs. 18, 19, 21, 22, 23, and 24.) The bar $y$ extends across the rear end portion of the machine against the under surfaces of the side bars $A^3$ $A^4$, and it has a companion bar $y'$ resting at its ends upon the upper surfaces of the side bars, the bars $y y'$ being secured together to clamp the side bars between them by suitable nut-bolts $y^3$. The bar $y$ is provided at one end with a slot $y^7$ and directly below said slot is a bearing $z^4$ in the bar $z$ for a rotary rod $x$, which extends upward through the slot $y^4$, being provided in the said slot with an eccentric $x'$ and at its upper end with a handle $x^2$. Longitudinally adjustable upon the shaft $B^2$ is a friction-pulley $B^3$ to engage and rotate the disk B' and a pulley $B^4$, at which it is belted to the driving-power. The shaft $B^2$ rotates constantly, and to cause it to rotate the shaft B the rod $x$ is turned by means of its handle $x^2$ to cause the eccentric $x'$, by bearing against the side of the slot $y^4$, to swing the free end of the bar $z$, and consequently the corresponding end of the shaft $B^2$, in the direction of the shaft B until the rotating pulley $B^3$ engages the friction-surface of the disk B'. The relative speed of the shafts B $B^2$ may be regulated by adjusting the pulley $B^3$ on the shaft $B^2$ toward or from the center of rotation of the disk B'.

C is a support affording bearings for the rotary shaft C', which carries the roll of paper from which the tags are to be formed; D, a guide for the web Z as it leaves the roll; E, a printing-press, which prints upon the web as the latter is drawn through; F, the washer, applying an eye-forming mechanism; G, the automatic feed-regulating mechanism, which causes the web to travel through the machine and to stop at proper intervals of distance and time to enable the printing to be performed, the washers to be applied, and the eye to be punched out; and H, cutting mechanism for beveling the corners of the tags and severing the latter from the web.

The printing-press E may be of any suitable construction which can be geared to the driving-power of the machine or otherwise caused to operate in conjunction with the tag-forming mechanism thereof to print upon the web Z. The printing-machine shown in the drawings is of special construction, which forms the subject of a separate application for Letters Patent, Serial No. 397,132, filed June 22, 1891, and no detailed description of its mechanism is thought to be necessary in the present connection. In its general construction the printing-press shown comprises a frame E', at the rear upper end of which is a shaft $a$, upon which is pivoted a platen-carrying frame or lever $E^2$, which may be raised by being swung upon its pivot to give access to the bed of the press, and when lowered may be secured rigidly in position by the lock mechanism $a'$ shown. The type-bed frame $E^3$ of the press is pivoted at its rear end upon the shaft $a$. Journaled in the frame E' and extending parallel with the main drive-shaft B is a shaft $a^2$, provided at opposite ends with cranks $a^3$. Each crank $a^3$ is pivotally connected at its free end to the lower end of a link $a^4$ and the links $a^4$ at their upper ends connect pivotally with the forward end of the type-bed frame. Fixed upon the shaft $a^2$ are gear-wheels $b$, $b^2$, and $b^4$ of different sizes, and longitudinally adjustable upon the shaft B are gear-wheels $b'$, $b^3$, and $b^5$, which rotate with the shaft. The wheels $b$ and $b^2$ are of the same size and when brought into mesh cause the shaft $a^2$ to be rotated at the same speed as the shaft B. The central wheel $b^2$ is larger and the central wheel $b^3$ is smaller than the wheels $b$ $b'$, and when they, instead of the others, are adjusted together the shaft $a^2$ rotates at one-half the speed of the shaft B. The wheel $b^4$ is longer than the wheel $b^2$ and the wheel $b^5$ is smaller than the wheel $b^3$, and when this pair, instead of the others, is adjusted together the shaft $a^2$ rotates at one-third the speed of the drive-shaft B. With each revolution of the shaft $a^2$ the type-bed is swung to and away from the platen. The web Z of tag material travels across the under surface of the platen, and with each oscillation of the type-bed an impression is printed upon the web. Thus when the gears $b$ $b'$ are coupled together the press gives one impression with each rotation of the shaft B. When the gears $b^2$ $b^3$ are coupled together, the press gives one impression with each two rotations of the shaft B, and when the gears $b^4$ $b^5$ are coupled together the press gives one impression with each three rotations of the shaft B. The intermittent feed, washer-applying, and web-severing mechanisms operate once with each rotation of the shaft B. In the operation of the machine the web is fed intermittently through the press and the latter is adjusted with relation to the shaft B to give an impression with each pause in the feed of the web or with each second or third pause, as may be desired. Thus there being practically no limit to the speed at which the feed, washer-applying, and web-cutting mechanism may be operated, it is an advantage, especially in the manufacture of tags, to be able to permit the press to run at one-half or one-third the speed of the other mechanisms and print two or three forms with each impression. I desire it understood that I do not limit myself to three pairs of speed-altering gears, as additional gears which will reduce the speed of the press to one-fourth, one-fifth, &c., of the speed of the shaft B may be employed without departing from the spirit of my invention.

While the printing-press is a desirable feature of my machine, it is not indispensable, as the tag-forming mechanism is complete in itself and may be employed for turning out blank tags.

Figures 21, 22, 23, 24, 25, 26, 27, 28, 29, 30, 31, 32, 33:
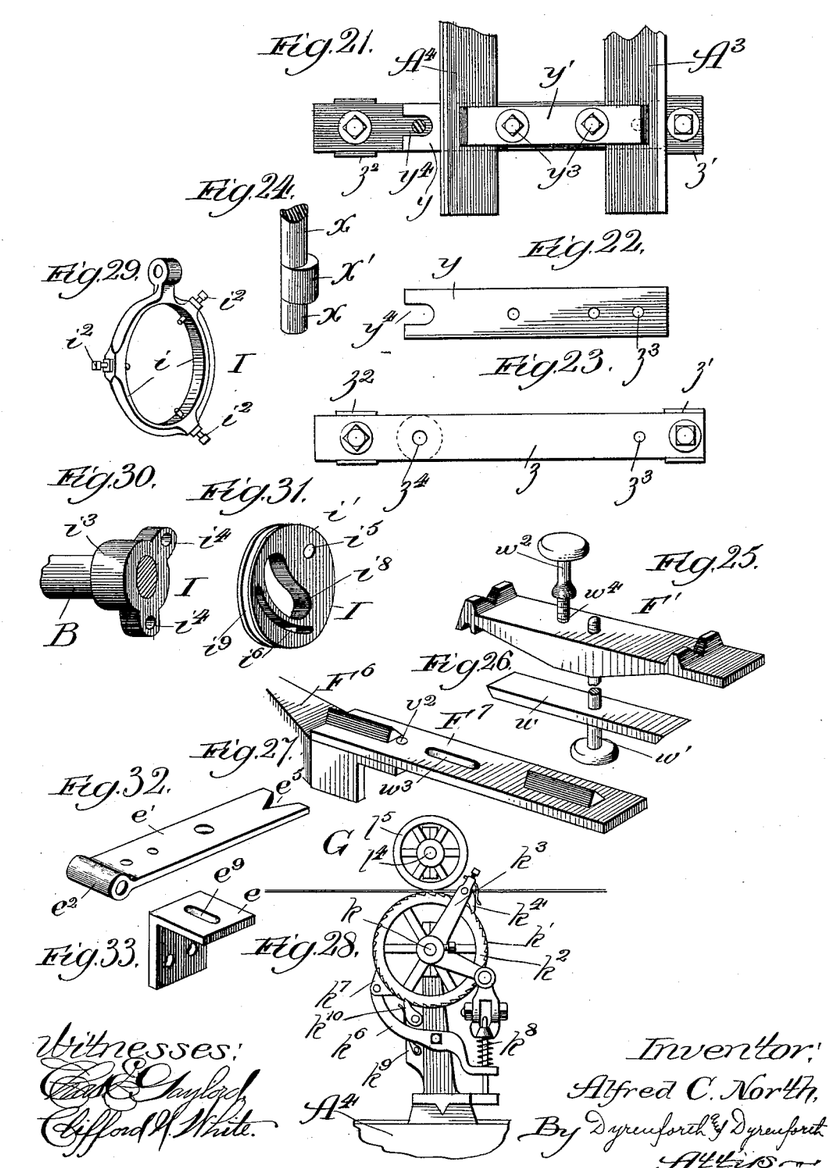
Figs. 21, 22, and 23, plan views of details of the shipping mechanism for starting and stopping the machine.
Fig. 24, a broken enlarged perspective view of a detail of the same mechanism.
Fig. 25, a top perspective view of a sliding support.
Fig. 26, a sliding companion bar for the sliding support shown in Fig. 25.
Fig. 27, a broken bottom perspective view of a sliding bed-plate.
Fig. 28, a front elevation of the web-feeding mechanism.
Figs. 29, 30, and 31, perspective views of parts detached of an eccentric.
Figs. 32 and 33, details in perspective, which form part of the corner-cutting mechanism shown in Fig. 17.
Figure 34:
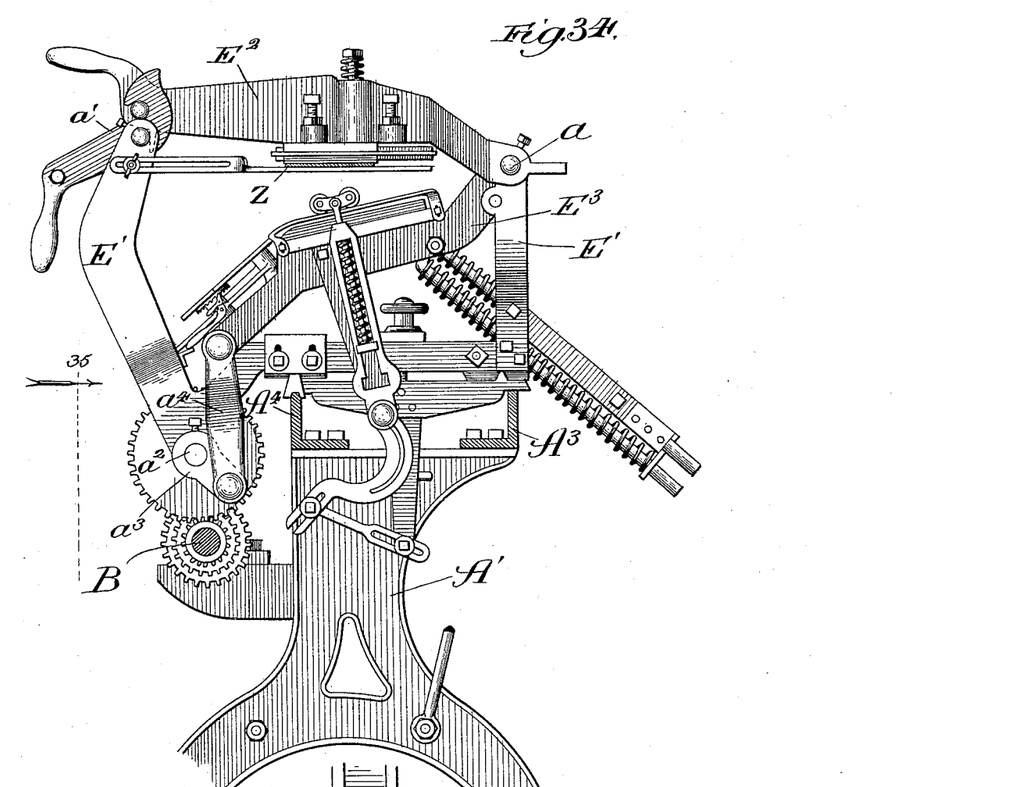
Fig. 34, an enlarged broken cross-sectional view of the machine, showing a printing-press in side elevation.
Figure 35:
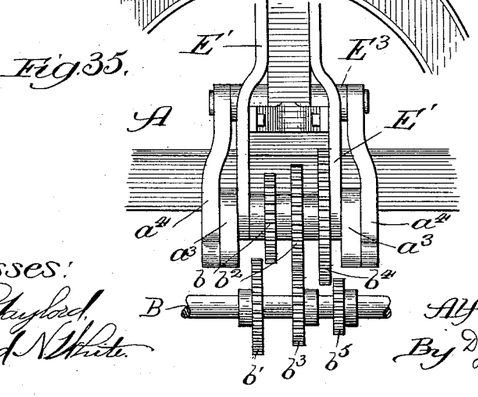
Fig. 35, a broken view taken from line 35 of Fig. 34, and illustrating in elevation adjustable speed-varying gears between the drive-shaft and printing-press.

The mechanisms F, G, and H are independently mounted on sliding supports F' G' H', respectively, which extend transversely of the machine, resting upon the rails $A^3$ $A^4$, and may be adjusted toward and from each other. The sliding supports F', G', and H' are substantial counterparts of each other and are all constructed as shown in Fig. 25. The mechanisms F G H may also be adjusted on their supports F' G' H' in a direction crosswise of the machine, as will appear later on. Each sliding support has a companion bar $w$, which slides against the under side of the rails $A^3$ $A^4$ and is held to its support by a hand-screw $w'$, the turning of which causes the support and companion bar to clamp the rails between them, and thus become firmly held in adjusted position.

Figures 2, 3, 12:
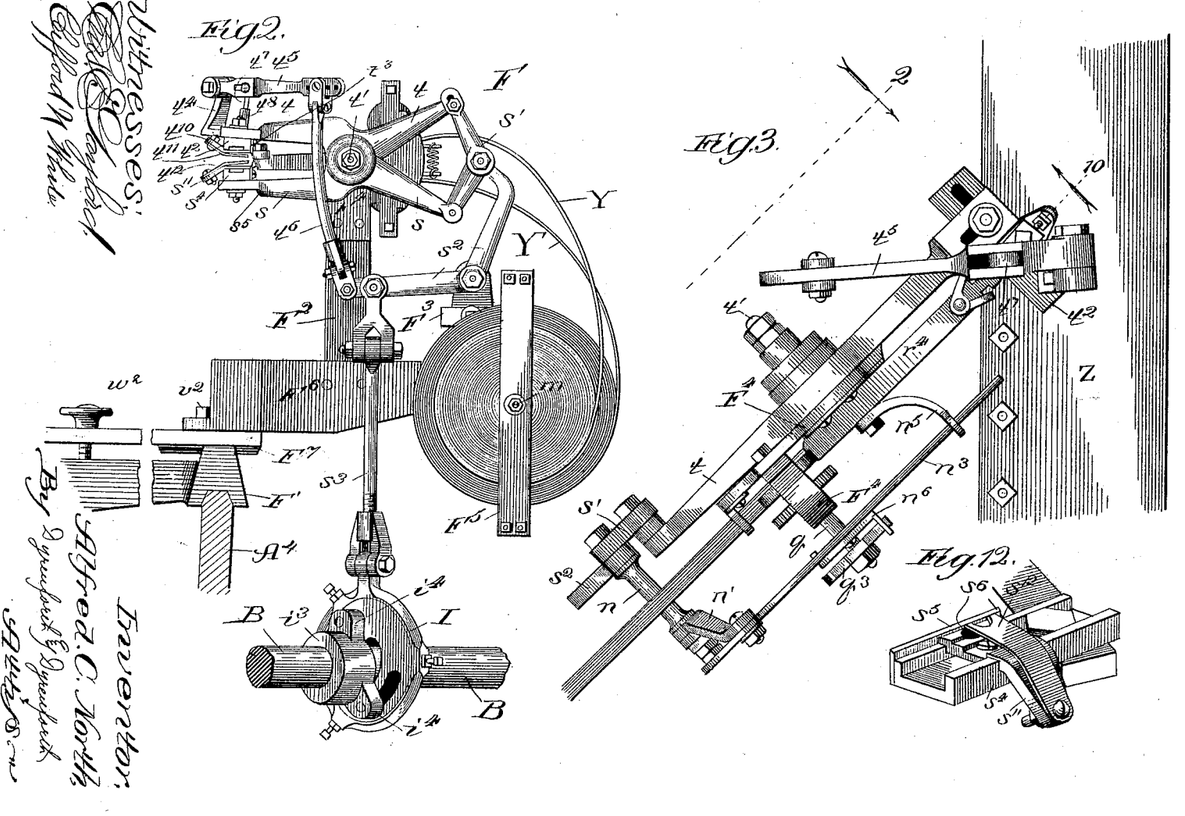
Fig. 2, an enlarged broken view, partly perspective and partly in elevation, of reinforcing piece or "washer" applying and punching mechanism, the view being taken from line 2 of Fig. 3 in the direction of the arrow and reduced.
Fig. 3, a top plan view, enlarged, of the mechanism shown in Fig. 2.
Fig. 12, a perspective view of the lower cutter-block for severing the washer stock.
Figure 5:
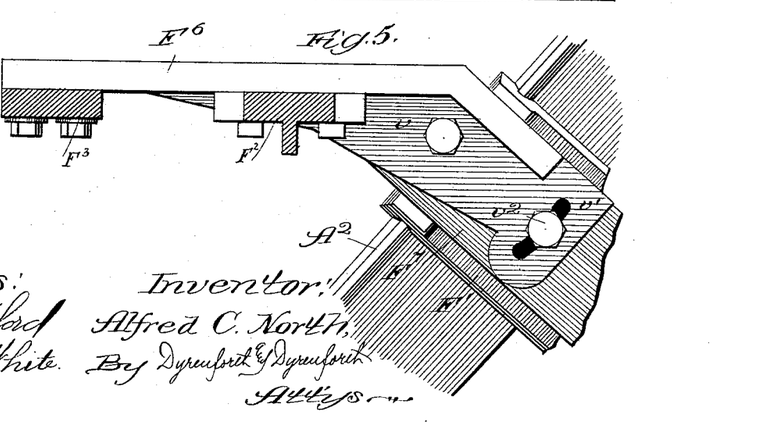
Fig. 5, a section taken on line 5 of Fig. 4 and viewed in the direction of the arrow.

The washer-applying and eye-forming mechanism is supported upon a bar $F^6$, pivotally secured by a bolt $v$ (see Fig. 5) to a bed-plate $F^7$, (see Figs. 5 and 26,) and having a segmental slot $v'$, through which a bolt $v^2$ passes into the bed-plate. The bar $F^6$ may be turned upon its pivot $v$ in the horizontal plane a distance limited by the length of the slot $v'$, whereby the angle at which the bar $F^6$ shall extend from the bed-plate may be regulated, as desired, and the parts may be firmly secured in adjusted position by the bolt $v^2$. On the bar $F^6$ is a standard $F^2$. The bed-plate $F^7$ is secured upon the support F' by a hand-screw $w^2$, Figs. 2 and 25, which passes down through an elongated slot $w^3$, Fig. 26, in the bed-plate $F^7$ into a threaded hole $w^4$, Fig. 25, in the sliding support F'. On loosening the hand-screw $w^2$ the bed-plate and all the parts carried by it may be slid longitudinally upon the support F' (in the direction crosswise of the machine) a distance corresponding with the length of the slot $w^3$, and then secured in adjusted position by tightening the hand-screw $w^2$, which clamps the bed-plate firmly against the support F'.

Following is a description of the mechanism: Two levers $t$ and $s$ are fulcrumed upon a pin $t'$ on the side of the standard $F^2$, and at their outer ends are pivotally connected to the opposite ends, respectively, of a toggle-lever $s'$, which is fulcrumed at its center upon a shaft $n$ on the end of a bell-crank lever $s^2$. The lever $s^2$ is fulcrumed upon a standard $F^3$, firmly secured to the bar $F^6$. Near its opposite end the bell-crank lever $s^2$ is pivotally connected by a rod $s^3$ with an eccentric I on the shaft B. The levers $t$ $s$ are provided at their free ends with cutter-blocks $t^2 s^4$, respectively, which extend parallel with each other at an angle to the plane of the levers $t$ $s$. At the inner edges of the cutter-blocks $t^2$ $s^4$ are knives $t^3$ $s^5$, respectively, which are arranged to cut in the direction of each other in the same plane with the movement of the levers $t$ $s$, as hereinafter described. At the end of the lever $t$, fastened upon the block $t^2$, is a lug $t^4$, upon which is fulcrumed at its end a lever $t^5$. The lever $t^5$ at its opposite end is pivotally connected by a link $t^6$ with the end of the bell-crank lever $s^2$ adjacent to the rod $s^3$. Between its ends the lever $t^5$ carries a punch $t^7$, which is connected pivotally to the lever $t^5$ and moves in a guide $t^8$, formed on lug $t^4$, and through an opening $t^9$ in the upper cutter-block $t^2$. Through the lower cutter-block $s^4$ is an opening $s^6$ in line with the opening $t^9$, affording a die for the punch to enter and cut against. Secured to the standard and extending forward therefrom in a plane between the levers $t$ $s$ is a rigid finger $s^7$, provided at its free end with a bifurcated head $s^8$, affording between its forks a guide for the web Z. The upper fork of the head $s^8$ has a straight shearing-edge $s^9$, past which the knife $t^3$ cuts, and the lower fork a similar edge $s^{10}$, past which the knife $s^5$ cuts. Secured to the cutter-block $s^4$ is a curved spring-bearing $s^{11}$, carrying a washer-compressing spring $s^{12}$, and on the block $t^2$ is a similar bearing $t^{10}$, carrying a washer-compressing spring $t^{11}$.

Figures 6, 7, 8, 9, 10, 11:
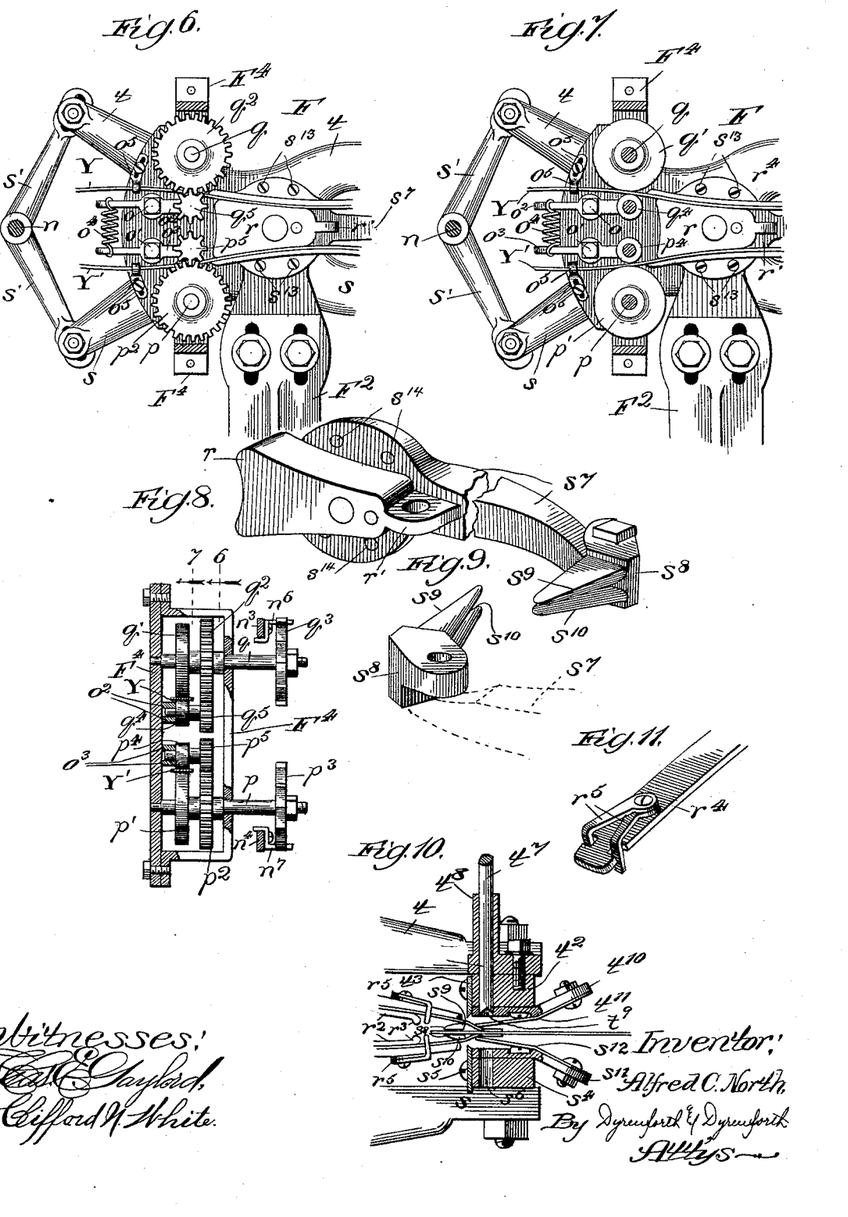
Figs. 6 and 7, sections taken on lines 6 and 7, respectively, of Fig. 8 and viewed in the direction of the arrows.
Fig. 8, a section taken on line 8 of Fig. 4 and viewed in the direction of the arrow.
Fig. 9, two perspective views showing opposite sides of the same detail.
Fig. 10, a section taken on line 10 of Fig. 3, viewed in the direction of the arrow and enlarged.
Fig. 11, a broken perspective view of one of the guides for the washer stock or web from which washers are cut.

$F^4$ is a yoke-frame secured to the upper end of the standard $F^2$ on the side of the latter opposite the levers $t$ $s$. On the yoke-frame at the standard $F^2$ is a block $r$, having its upper and lower edges shaped into guide-surfaces for the upper web Y and lower web Y' of the washer-stock. The block $r$ is formed integral with the finger $s^7$, as shown in Fig. 9, and the finger is secured to the standard $F^2$ by screws $s^{13}$, passing through the openings $s^{14}$. At the forward end of the block $r$ is a projection $r'$, having flat upper and lower sides, upon which respectively are secured curved guide-blades $r^2$. The blades $r^2$ are made as thin as practicable in the horizontal plane and are provided at their ends with knobs or stops $r^3$. Secured to the frame $F^4$ at the standard $F^2$, above and below the block $r$, respectively, are flat guide-strips $r^4$, which follow the contour of the adjacent guide-edges of the block $r$ and blades $r^2$, being separated therefrom by a little more than the thickness of the webs Y Y', which are guided between them, as hereinafter described. On each of the guide-strips $r^4$ are the guide-fingers $r^5$ (see Fig. 11) for the lateral edges of the webs Y Y', which are pivoted in place on a clamp-screw, as shown, so that they may be adjusted to correspond to the width of the webs and tightened in adjusted position. Journaled in the yoke portion of the frame $F^4$ is a shaft $q$, and directly below it a shaft $p$. On the shaft $q$ in the yoke-frame are a friction-roller $q'$ and a cog-wheel $q^2$, and beyond the yoke-frame the shaft carries a ratchet-wheel $q^3$, and on the shaft $p$, corresponding in relative position with those on the shaft $q$, are a roller $p'$, cog-wheel $p^2$, and ratchet $p^3$. Fulcrumed at $o$ $o'$ in the yoke-frame $F^4$ are levers $o^2$ and $o^3$, one above the other, as shown, having journaled in their ends loose short shafts which carry, respectively, friction-rollers $q^4$ $p^4$ and pinions $q^5$ $p^5$. At the ends opposite their shafts the levers $o^2$ $o^3$ are attached to opposite ends of a spring $o^4$, which tends normally to maintain the pinions $q^5$ $p^5$ in engagement, respectively, with the cog-wheels $q^2$ $p^2$ and the rollers $q^4$ $p^4$ pressed against the rollers $q'$ $p'$, respectively.

On the horizontal shaft $n$, which is carried, as stated above, by the upper end of the bell-crank lever $s^2$, are arms $n'$ $n^2$, to the free ends of which are adjustably secured horizontal and forward extending rods $n^3$ $n^4$. The rods $n^3$ and $n^4$ reciprocate through guide-openings in a two-armed bracket $n^5$ on the frame $F^4$ and carry spring-pawls $n^6$ $n^7$, which engage, respectively, with the ratchets $q^3$ $p^3$. $F^5$ is a yoke-frame secured to the standard $F^3$, and extending through the frame $F^5$ is a removable pin $m$, upon which the rolls of washer-stock are mounted to rotate. On the yoke-frame, in the positions shown, are guides $o^5$ $o^5$ for the webs $Y$ $Y'$, respectively.

The washer-stock is coated on one side with an adhesive substance and dried before it is wound into rolls, the adhesive substance being, preferably, of a character to be softened by moisture. The web $Y$ is wound upon a spool with its coated surface on the inner side and the web $Y'$ is wound with its coated surface on the outer side.

In operation the rolls of washer-stock are inserted in the frame $F^5$ and mounted to rotate on the pin $m$. The web $Y$ is passed through the upper guide $o^5$, thence between the rollers $q'$ $q^4$, and between the guides $r$ $r^2$ on the one side and upper guide $r^4$ on the other side, and thence over the fork $s^9$ of the head $s^8$. The web $Y'$ is passed through the lower guide $o^5$, thence between the rollers $p'$ $p^4$, and between the guides $r$ $r^2$ and the lower guide $r^4$ and across the under side of the fork $s^{10}$ of the head $s^8$. The forward ends of the webs $Y$ $Y'$ should project beyond the shearing-edges of the forks $s^9$ $s^{10}$ a distance equal to the width of the webs. The rods $n^3$ $n^4$ are so adjusted upon the arms $n'$ $n^2$ that their pawls in each backward reciprocation will turn the ratchets $q^3$ $p^3$ one notch, which will cause the friction-rollers $q'$ $p'$ to move the webs $Y$ $Y'$ forward a distance corresponding approximately to the width of the webs. Between the adjacent edges of the guide-blades $r^2$ a dampened sponge $Y^3$ is inserted, and owing to the thinness of the blade the sponge will swell into contact with the adjacent coated surfaces of the washer-stock. The knobs $r^3$ on the blades operate as stops to prevent the sponge from being drawn forward by the webs.

Figure 4:
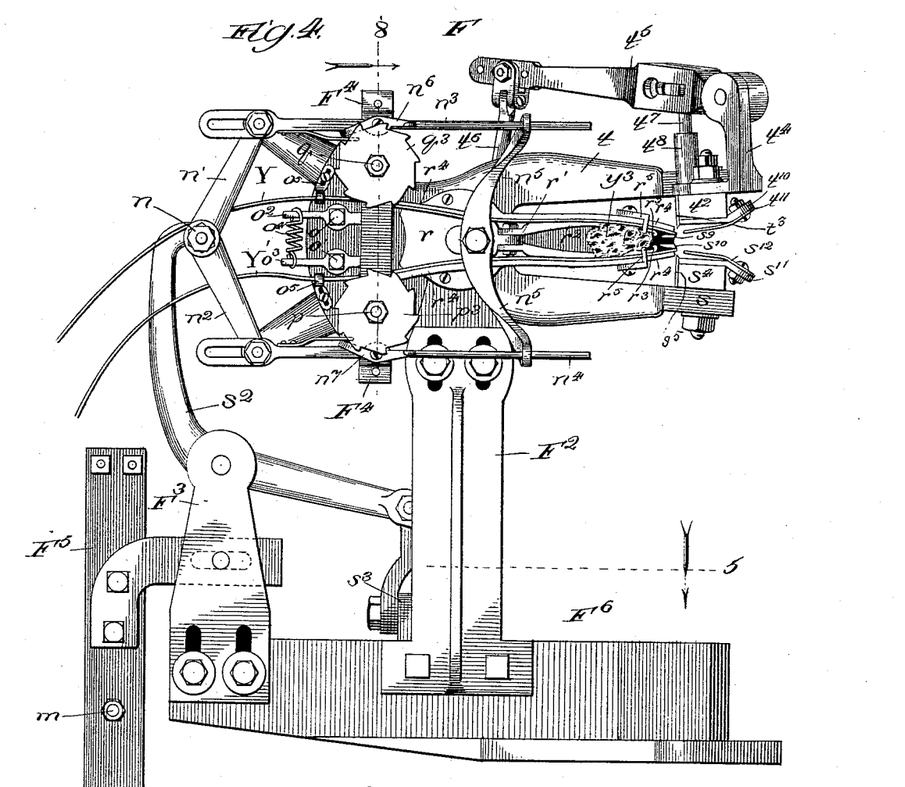
Fig. 4, an enlarged view in elevation of the side of the same mechanism opposite that shown in Fig. 2.

In the position shown in Fig. 4 the link $s^3$ is nearly but not quite at the limit of its rise, and in completing its upward movement the rods $n^3$ $n^4$ are retracted to cause their pawls to turn the ratchets and the rollers $q'$ $p'$ to advance the ends of the webs $Y$ $Y'$ beyond the head $s^8$. In the succeeding downward stroke of the link $s^3$ the bell-crank lever $s^2$ is turned on its pivot to advance the rods $n^3$ $n^4$ and cause the toggle $s'$ to spread apart the adjacent arms of the levers $t$ $s$, causing the cutter-blocks $t^2$ $s^4$ to advance toward each other, and shear off the washers when they meet the shearing-edges $s^9$ $s^{10}$, the springs $t^{11}$ $s^{12}$ operating to retain the washers against the adjacent opposite sides of the web $Z$ until the blocks compress the washers in place. In the meantime the rise of the link $t^6$ swings the lever $t^5$ on its pivot and forces the punch $t^7$ down through the center of the washers and intervening web $Z$ and forms the eye for the tag. In the subsequent rise of the link $s^3$ the parts are returned to their initial positions and the operation is completed. The support $G'$ is similar to the support $F'$. (Shown in Fig. 25.) It rests near opposite ends, respectively, upon the rails $A^3$ $A^4$, and below it is a companion bar $w$, which fits and slides at its ends against the under sides of the rails $A^3$ $A^4$, and is held to the support $G'$ by a hand-screw $w'$, which when tightened causes the support and companion bar to clamp the rails between them.

On the support $G'$ and adjustable longitudinally thereon is a bed-plate $G^2$. The bed-plate $G^2$, like the bed-plate $F^7$, has an elongated slot corresponding to the slot $w^3$, Fig. 26, and a hand-screw $G^3$ extends through the said slot into a threaded opening in the support $G'$, corresponding in position to the opening $w^4$ of the support $F'$, Fig. 25. Thus, like the bed-plate $F^7$, the bed-plate $G^2$ may be adjusted longitudinally (or crosswise of the machine) upon its support. Rising from the bed-plate $G^2$ are two standards $l$ and $l'$, joined together at their tops by a cross-bar $l^2$. Pivoted to the top of the standard $l'$ is an arm $l^3$. A shaft $k$ is journaled on the standards and extends beyond the standard $l$, where it carries a friction-roller $k'$ and a ratchet-wheel $k^2$. Journaled on the arm $l^3$ is a shaft $l^4$, carrying a friction-roller $l^5$. Between two lugs $l^6$ $l^7$, respectively, on the standard $l'$ and rear end of the arm $l^3$ is confined a stiff spring $l^8$, which tends normally to press the friction-roller $l^5$ against the roller $k'$. Upon the shaft $k$, adjacent to the ratchet-wheel $k^2$, is fulcrumed a loose bell-crank lever $k^3$, carrying at one end a spring-pawl $k^4$, which engages the teeth of the ratchet-wheel. At its opposite end the lever $k^3$ is connected pivotally by a rod $k^5$ with an eccentric I on the shaft B. Fulcrumed on the standard $l$ is a lever $k^6$, carrying a brake-shoe $k^7$, which is pressed by a spring $k^8$ at the opposite end of the lever against the roller $k'$, and upon a bracket $k^9$ is a spring-dog $k^{10}$, which engages the teeth of the ratchet-wheel $k^2$ to prevent return movement of the latter.

Figures 13, 14:
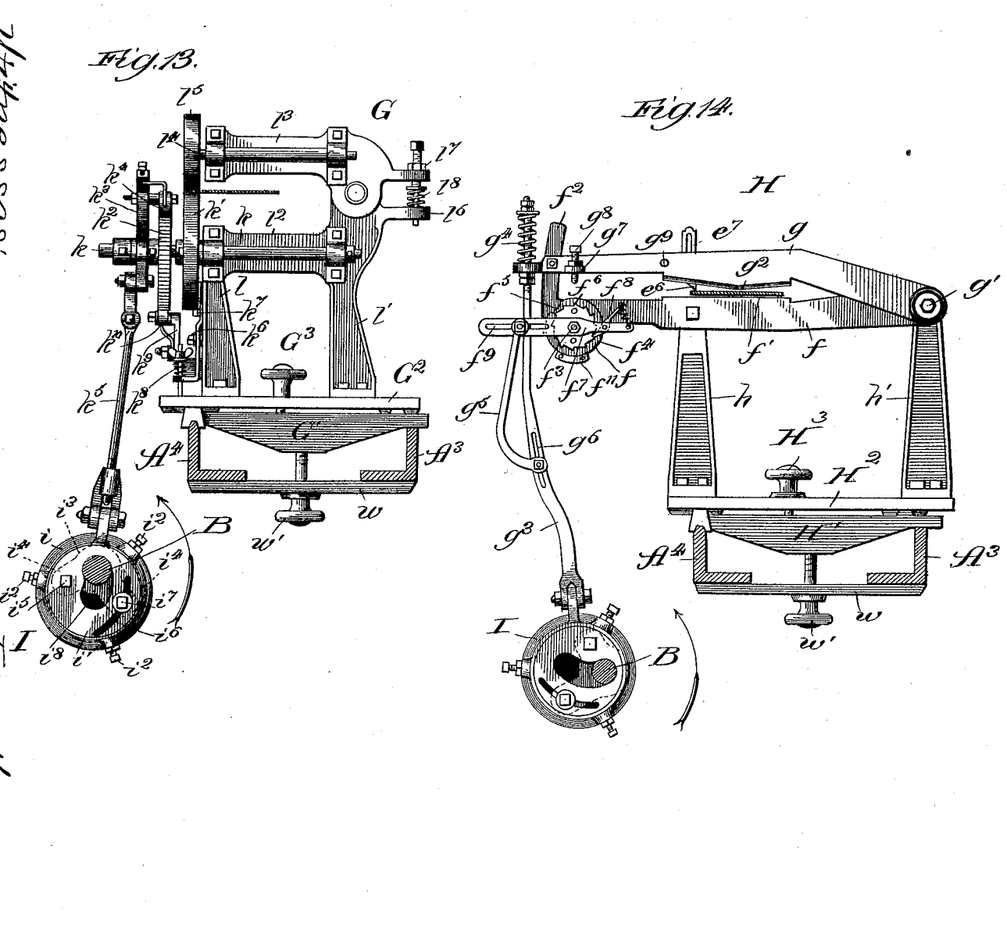
Fig. 13, a section taken on line 13 of Fig. 1, viewed in the direction of the arrow and showing the web-feeding mechanism in side elevation.
Fig. 14, a section taken on line 14 of Fig. 1, viewed in the direction of the arrow and showing in elevation the mechanism for cutting the tags from the web.

The feed mechanism G must be adjusted with great accuracy in order that it may cause the web Z to travel the exact predetermined distances at the proper intervals of time, which must vary according to the sizes of the tags to be turned out and the speed at which the machine is operated. The feed mechanism is regulated by the adjustment of the eccentric I, which is of a special improved construction adapting it particularly to the purpose in hand, and it is shown in detail in Figs. 29, 30, and 31. It comprises a rim $i$, to which the rod $k^5$ is pivotally connected, and a revolving center $i'$, having a peripheral groove $i^9$. The rim $i$ is held against displacement from the center by machine-screws $i^2$, which extend through the rim and project loosely into the peripheral groove $i^9$ on the center in such a way as to present but little frictional resistance to the rotation of the latter. Tightened upon the shaft B is a collar $i^3$, having radial wings $i^4$ in the relative positions shown, provided with threaded bolt-holes. The center $i'$ is fastened by a screw-bolt at $i^5$, the bolt being shown in Fig. 13, to one of the wings $i^4$, and toward its opposite side the center $i$ is provided with a segmental slot $i^6$, through which it may be adjustably fastened by a bolt $i^7$, Fig. 13, to the opposite wing of the collar $i^3$. Extending from the center nearly to the periphery of the center $i'$ is a segmental slot $i^8$ large enough to fit loosely over the shaft B, which passes through it. The segmental slots $i^6$ $i^8$ each describe an arc of which $i^5$ is the center. To adjust the eccentric to regulate its throw, the bolt $i^7$ is loosened and the center of rotation changed by swinging the center $i'$ upon the pivot $i^5$ to change the relative position of the shaft B in the slot $i^8$.

The mechanism for beveling the corners of the tags and severing the latter from the web Z is mounted upon a bed-plate $H^2$, which is secured to the sliding support H' in such a way that it may be adjusted longitudinally thereon and secured in adjusted position by the hand-screw $H^3$.

The support H' and bed-plate $H^2$ are substantial counterparts of the support G' and bed-plate $G^2$, and the adjustment of the support longitudinally of the machine and of the bed-plate crosswise thereof are effected in the same way.

It is frequently desired by those who use many tags to have them furnished in sheets containing each a series of tags partly severed from each other and held lightly together at the upper and lower corners in such a way as to render them easy to separate without injuring the appearance of the tags. This way of providing the tags is also preferred by the manufacturer on account of the facility it gives to the handling and packing thereof. While my invention is not limited to the employment of any particular severing mechanism, the drawings illustrate a gang-cutter of my improved construction which may be regulated to divide the web Z into sheets containing each a desired number of tags partly severed from each other.

Upon the bed-plate $H^2$ are two standards $h$ and $h'$, to which is secured a cross-bar $f$, having a shearing-edge $f'$ and at one end an upwardly-extending guide projection $f^2$. The knife $g$ is pivoted at $g'$ to the top of the standard $h'$ and is formed with an angular cutting-edge $g^2$, having its initially-cutting portion at about the center of its extent, from which, as will be seen, it will cut both ways a distance depending upon the degree of lowering of the knife, and consequent proportion of the edge $g^2$, which passes the edge $f'$. The knife is connected, by means of the link $g^3$, with an eccentric I on the shaft B. The link $g^3$ passes through an opening in the free end of the knife $g$, and between its upper end and the knife is confined a stiff spring $g^4$ to render the connection yielding. On the bar $f$ is a short shaft $f^3$, carrying a disk $f^4$, provided on its periphery with a short flattened or recessed surface $f^5$ and a ratchet-wheel $f^6$, which is fastened to the disk. Fulcrumed upon the shaft $f^3$ is a lever $f^7$, carrying at one end a spring-pawl $f^8$, engaging the ratchet-wheel, and provided toward its opposite end with an elongated slot $f^9$. A link $g^5$ is adjustably and pivotally connected at one end to the lever $f^7$ in its slot $f^9$ and at its opposite end it is similarly connected to the link $g^3$ at an elongated slot $g^6$ in the latter. Directly over the disk $f^4$ in a bearing $g^7$ on the knife $g$ is an adjustable set-screw $g^8$. On a bracket $f^{10}$, secured to the bar $f$, is a brake-shoe $f^{11}$, which is maintained in contact with the disk $f^4$ to prevent the latter being turned to the backward movement of the pawl $f^8$.

In operation the knife $g$ is caused by the eccentric I to rise and fall on its pivot $g'$ with each revolution of the shaft B, and simultaneously therewith the lever $f^7$ is swung up and down on its pivot. The ratchet-wheel $f^4$ may have twelve teeth, as shown, and the link $g^5$ may be adjusted in the slots $f^9$ $g^6$ to increase or diminish the throw of the lever $f^7$ to cause the pawl $f^8$ to engage the next adjacent tooth or every second, third, or fourth tooth of the ratchet-wheel to turn the disk $f^4$ a correspondingly-proportionate part of a revolution with each operation. With each fall of the knife $g$ the set-screw $g^8$ strikes the periphery of the disk $f^4$ and limits the descent of the knife. The set-screw $g^8$ is so adjusted as to cause the knife to descend only far enough when the set-screw strikes the circular portion of the periphery of the disk $f^4$ to sever the web Z from its central line nearly but not quite to the edges, and when the set-screw strikes the recessed or flattened part $f^5$ of the disk to cut entirely across the web. Thus, as will appear later on, by adjusting the throw of the lever $f^7$ the tags may be turned out in series of, say, twelve or any division thereof, the members of each series being held together only at their opposite end portions.

Figures 15, 16:
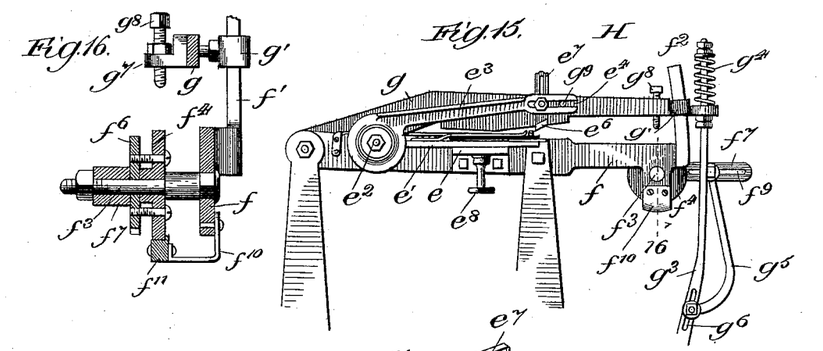
Fig. 15, a broken view of the opposite side of the cutter, illustrated in Fig. 14 and showing the corner-cutters.
Fig. 16, a section taken on line 16 of Fig. 15, viewed in the direction of the arrow and enlarged.
Figures 17, 18, 19, 20:
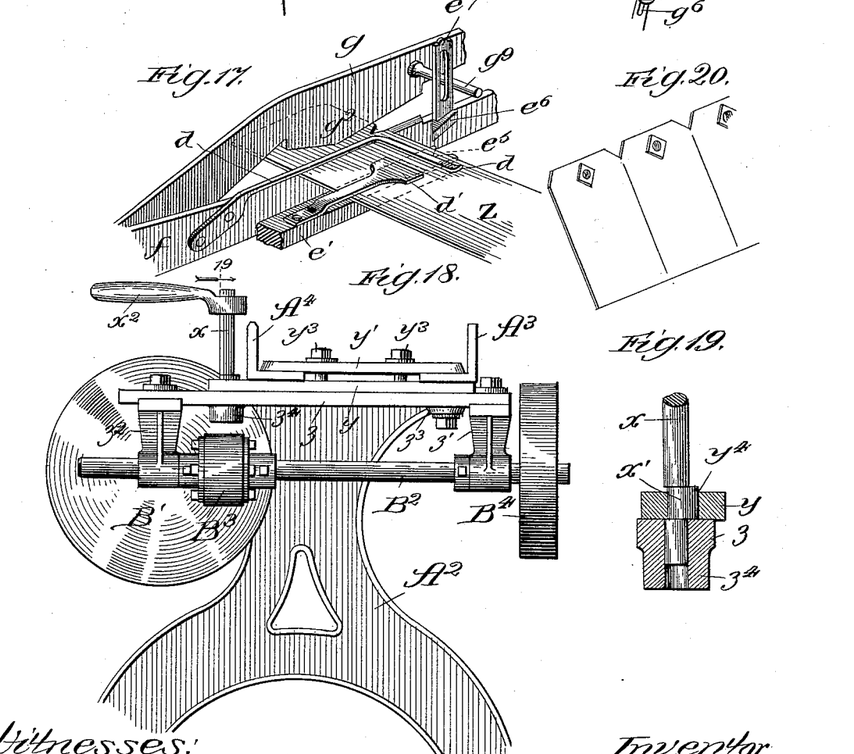
Fig. 17, a broken perspective view of the cutting mechanisms shown in Fig. 15.
Fig. 18, a broken elevation of the rear end of the machine.
Fig. 19, an enlarged section taken on line 19 of Fig. 18 and viewed in the direction of the arrow.
Fig. 20, a perspective view of a gang of finished tags.

On the side of the bar $f$ is a bracket $e$, Figs. 15 and 33, to which is adjustably secured a plate $e'$, Figs 15 and 32. Pivoted upon the plate at $e^2$ is an arm $e^3$, having a slotted end $e^4$, into which a pin $g^9$, carried by the knife $g$, extends. The engagement of the pin $g^9$ with the arm $e^3$ at the slot $e^4$ causes the arm to rise and fall with the knife. In the end of the plate $e$ is a notch $e^5$, affording shearing-edges, and $e^6$ is a web-notching knife which is adjustably secured by its shank $e^7$ to the arm $e^3$ at the slot $e^4$. The knife $e^6$ cuts against the angular shearing-edge $e^5$ and the notches it cuts in the web Z produce the beveled corners of the tags. In the bracket $e$ is a slot $e^9$, at which the plate $e'$ is secured by a hand-screw $e^8$, which passes up through the slot $e^9$ into a threaded hole $e^{10}$ in the plate $e'$. The plate $e'$ and parts carried thereby may be slid upon the bracket $e$ to adjust it toward or from the bar $f$ a distance corresponding to the length of the slot $e^9$, and it may be secured in adjusted position by means of the hand-screw $e^8$. On the bar $f$ is a guide $d$ and on the plate $e'$ a guide $d'$, Fig. 17, both of which extend over the upper surface of the web Z and operate to keep it down.

The relative positions of the various separate mechanisms which co-operate in forming the complete tags must be changed with each change in the width of the tags to be produced.

Shipping-tags are furnished in standard sizes, which are usually designated in the trade by numbers, the widths varying by quarter-inches between sizes. The eccentrics I may be loosened upon the shaft B and slid thereon when the positions of their respective mechanisms are changed. For each change in width of the tags to be produced the distance between the corner-cutter and severing-knife must be increased or diminished, and this may be done, as described, by loosening the hand-screw $e^8$ and sliding the plate $e'$ on the bracket $e$.

The feed mechanism G is regulated by means of the eccentric I, which operates it, and the distance of rotation of the friction-rollers $k'$ $l^5$ with each operation is controlled by the throw of the pawl-carrying lever $k^3$. Thus all the operating parts of my machine may be adjusted quickly and with great nicety, and when once adjusted there can be no variation in the tags that are turned out. While all three of the eccentrics upon the shaft B are of my improved construction, the mechanisms F and H may be operated by any other suitable eccentrics, as the adjustments thereof need not be changed.

The tags illustrated as those manufactured in my improved machine are provided with washers of particular construction, they being of diamond shape so placed upon the tag as to cause one angle to extend in the direction of strain—that is to say, lengthwise of the body portion of the tag. While I prefer to employ washers of that shape, on account of their strength and the economy of their manufacture, I do not limit the employment of my washer-applying mechanism to the manufacture of washers of any particular shape, which could be formed by changing the contour of the cutting-knives or providing other modifications of the mechanism shown which would not depart from the spirit of my invention.

In tags of the smaller sizes it is usual to place the eyes nearer to the top ends than in tags of larger sizes. Mounting the washer-applying mechanism, as described, upon a support which permits it to be independently adjusted in a direction crosswise of the machine is therefore an important feature of my invention. It is also an advantage to have the feed mechanism adjustable in the same manner, whereby it may be caused to engage the web toward or away from its edge, as desired.

Figure 1:
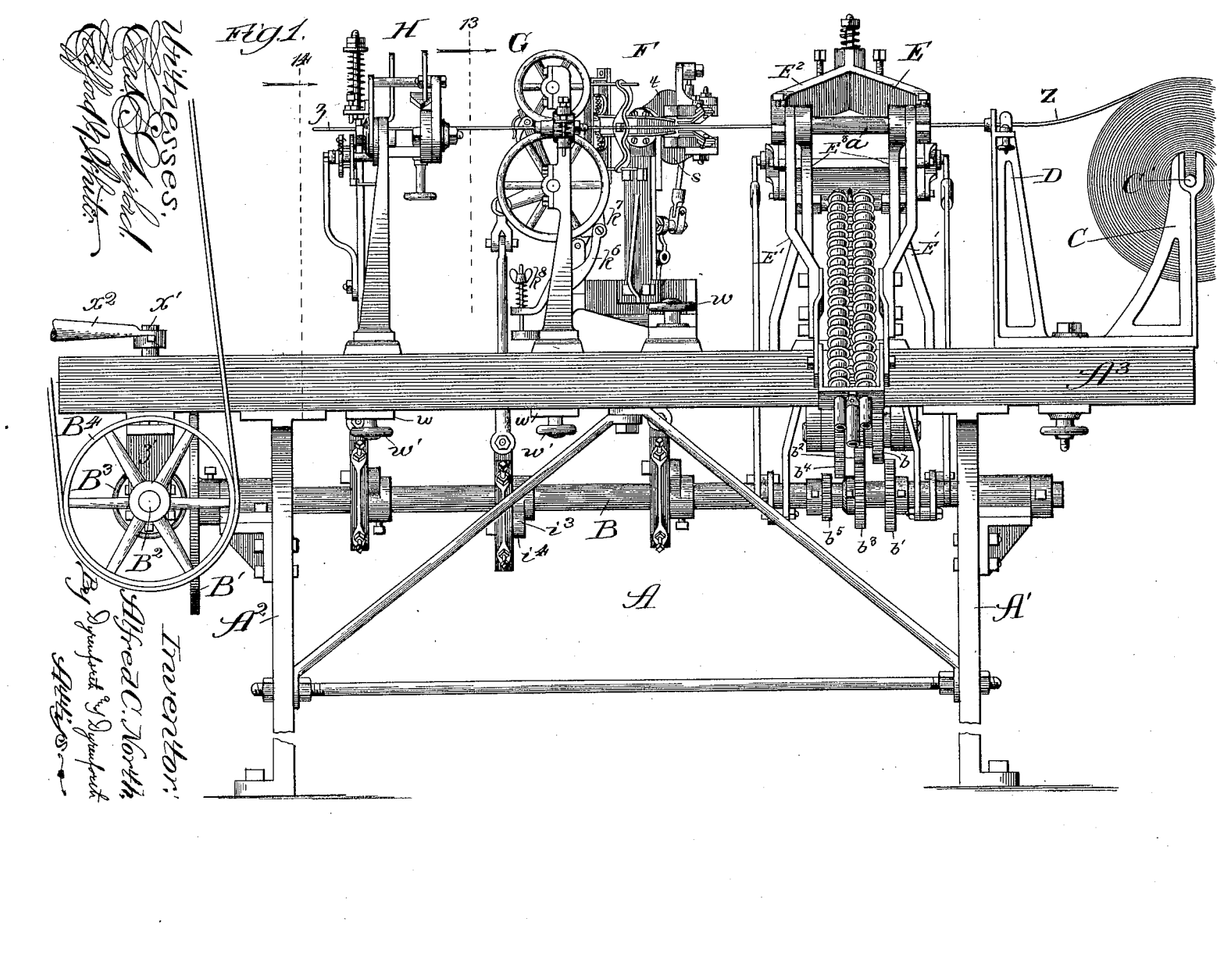
Figure 1 is a view in side elevation, partly broken, of a machine of my improved construction for turning out finished and printed tags from a continuous web of paper.

As before stated, between the printing-press E and shaft B are speed-varying gears, and these are described and claimed, broadly, in my aforesaid pending application for Letters Patent. They comprise gear-wheels on the shaft B of varying diameters, and an equal number of gear-wheels, also of varying diameters, on the driving-shaft of the printing-press. The gears to the right in Fig. 1 are of the same size and are intended to cause the drive-shaft of the press to rotate one revolution with each revolution of the shaft B. Of the middle pair of gears the gear-wheel on the shaft B has one-half as many teeth as the gear-wheel on the press-shaft, and of the gears to the left the gear-wheel on the shaft B has one-third as many teeth as the gear-wheel on the press-shaft. Each pair of gears may be caused to engage or disengage at will, and, when desired, they may all be disengaged to cause the press to remain idle while the tag-forming mechanisms operate to manufacture blank tags. The tag-forming mechanisms when the press is idle may be operated at as high a speed as desired and at the expense of much less power than where the press also is operated.

As before stated, the printing-press shown in the drawings forms the subject of a separate concurrent application filed by me June 22, 1891, bearing Serial No. 397,132. The claims of that application are to the construction of the press and to the speed-varying mechanism between the press and the web-feeding and web-cutting mechanisms. I do not in the present application wish to claim anything shown, described, and claimed in my said application, Serial No. 397,132, but confine myself to the construction of the washer-applying and eye-forming mechanisms and the combination thereof with a printing-press, web-feeder, web-cutter, and other features which go to make up the machine for turning out tags or analogous articles. In still another separate concurrent application filed by me June 22, 1891, Serial No. 397,134, I have shown a machine for stringing tags which is in the nature of an attachment for the machine forming the subject of the present application. Whatever is shown, described, and claimed in said application, Serial No. 397,134, I do not desire to claim in this case.

What I claim as new, and desire to secure by Letters Patent, is—

1. In a machine for manufacturing tags and analogous articles from a continuous web, the combination, with the main frame and driving-power, of intermittingly-actuated web feed and cutting mechanisms on the said frame connected with the driving-power, washer-applying mechanism connected with the driving-power, and a support for the said washer-applying mechanism, mounted upon the said frame and adjustable thereon crosswise of the frame, substantially as described.

2. In a machine for manufacturing tags and analogous articles from a continuous web, the combination, with the main frame and driving-power, of intermittingly-actuated web feed and cutting mechanisms on the said frame connected with the driving-power, washer-applying mechanism connected with the driving-power, and a support for the said washer-applying mechanism mounted upon the said frame and adjustable thereon crosswise of the frame and to different angles with relation to the frame, substantially as described.

3. In a washer-applying and eye-forming mechanism, the combination, with the support and driving-power, of co-operating levers connected with the driving-power carrying cutters and washer-compressing mechanism, a punch-die in one lever, a punch pivotally mounted upon the other lever and actuated by the driving-power to reciprocate into and out of the die, and intermittingly-acting washer-stock feed mechanism operated from the driving-power to feed the washer-stock to the cutters and punch, substantially as described.

4. In a machine for manufacturing printed tags or analogous articles from a continuous web, the combination, with the main frame and driving-power, of a printing-press on the frame operative to print upon the web, washer-applying, eye-forming, and web-severing mechanisms upon the frame, adjustable intermittent feed mechanism for the web, and a variable-speed mechanism between the printing-press and the mechanisms for feeding the web, forming the eye, applying the washer, and severing the web, substantially as described.

5. In a machine for manufacturing printed tags or analogous articles from a continuous web, the combination, with the main frame and driving-power, of a printing-press on the frame operative to print upon the web, washer-applying, eye-forming, and web-severing mechanisms upon the frame, adjustable intermittent feed mechanism for the web, and separable variable-speed mechanism between the press and the mechanisms for feeding the web, applying the washer, forming the eye, and severing the web operative at will to change the speed of the press with relation to the other said mechanisms or to disconnect the press therefrom, substantially as described.

6. In a machine for manufacturing printed tags or analogous articles, the combination of a frame A, a shaft B, mounted on the frame and extending longitudinally thereof, a printing-press on the frame geared to the shaft and operative to print upon a continuous web, an adjustable intermittent feed for the web upon the frame geared to the shaft B, a washer-applying and eye-forming mechanism and a corner-cutting and tag-severing mechanism, each mounted upon and adjustable along the frame, and eccentrics on the shaft B, longitudinally adjustable thereon, with which the said mechanisms are connected, substantially as described.

7. In a washing-applying and eye-forming mechanism, the combination, with the support and driving-power, of a standard $F^2$ on the support, levers $t\,s$, fulcrumed on the standard connected with the driving-power and provided each with a cutter and washer compressing mechanism, an oscillating lever $t^5$, fulcrumed on the lever $t$ and connected with the driving-power, carrying a punch which reciprocates through a guide on the lever $t$, a punch-die on the lever $s$, and intermittingly-acting washer-stock-feed mechanism operated from the driving-power to feed the washer-stock to the cutters and punch, substantially as described.

8. In a washer-applying and eye-forming mechanism, the combination, with the support and driving-power, of a standard $F^2$ on the support, levers $t\,s$, fulcrumed on the standard and carrying cutter-knives, a toggle-lever $s'$, connected at its ends with the ends of the levers $t\,s$, a bell-crank lever $s^2$, fulcrumed on the support and connected at one arm with the toggle-lever joint and at the opposite arm with the driving-power, an oscillating lever $t^5$, fulcrumed on the lever $t$ and connected with the driving-power, carrying a punch which reciprocates through a guide on the lever $t$, a punch-die on the lever $s$, and intermittingly-acting washer-stock-feed mechanism operated from the driving-power to feed the washer-stock to the cutter-knives and punch, substantially as described.

9. In a washer-applying and eye-forming mechanism, the combination, with the support and driving-power, of a standard $F^2$ on the support, levers $t\,s$, fulcrumed on the standard and provided each with a cutter and washer compressing mechanism, a punch-die on the lever $s$, a punch mounted on the lever $t$ and operated from the driving-power to reciprocate through a guide on the lever $t$ into the punch-die, and mechanism for feeding the webs of washer-stock to the cutters and punch, comprising friction-rollers engaging opposite sides of the webs, ratchet-wheels connected with the rollers, and reciprocating rods mounted in guides on the standard connected with the driving-power and carrying pawls to engage the ratchet-wheels and turn them and the feed-rollers intermittingly, substantially as described.

10. In a washer-applying and eye-forming mechanism, the combination, with co-operating levers carrying the cutter-knives and punch and with the intermittent feed mechanism for the webs of gummed washer-stock Y Y', of guides $r^4$ for the outer surfaces of the said webs and guide-blades $r^2$ for the inner gummed surfaces thereof, and a gum-softening medium between the guide-blades $r^2$, substantially as and for the purpose set forth.

11. In a machine for manufacturing tags and analogous articles from a continuous web, the combination, with the main frame and drive-shaft, of intermittingly-operated feed mechanism mounted in a frame adjustable upon the main frame crosswise thereof and comprising the feed-rollers $k'$ $l^5$, a ratchet-wheel connected with the roller $k'$, and a pawl-carrying lever to engage the ratchet, connected eccentrically with the drive-shaft, substantially as described.

12. In a machine for manufacturing tags and analogous articles from a continuous web, the combination, with the intermittent feed mechanism for the web, of an eccentric I upon the driving-shaft of the machine and with which the feed mechanism is connected, comprising a collar $i^3$, secured upon the shaft, a revolving center $i'$, pivotally secured near its periphery to the collar and provided with a central segmental opening $i^8$, through which the shaft extends, and an outer segmental opening $i^6$, through which it is adjustably secured to the collar by a bolt $i^7$, both segments describing an arc of which the said pivotal connections form the center, and a rim $i$, in which the center rotates, substantially as described.

13. In a machine for manufacturing tags and analogous articles from a continuous web, the combination, with the driving-shaft and intermittent feed for the web, of a gang-cutter comprising a stationary arm $f$, provided with the shearing-edge $f'$, a vertically-oscillating lever $g$, connected eccentrically with the driving-shaft and provided with the angular shearing-edge $g^2$, a shaft $f^3$, journaled on the arm $f$ and carrying a ratchet-wheel $f^6$, and a disk $f^4$, having a recess $f^5$ in its periphery, an oscillating lever $f^7$, fulcrumed on the shaft $f^3$ and connected with the driving-shaft, carrying a pawl to engage the ratchet-wheel intermittingly and turn the disk $f^4$ part of a revolution, and a stop $g^8$ on the lever $g$ to engage the periphery of the disk $f^4$ in each downward oscillation of the lever $f$ to limit the descent thereof, substantially as and for the purpose set forth.

14. In a machine for manufacturing tags and analogous articles from a continuous web, the combination, with the main frame A and driving-shaft B, of power-transmitting and speed regulating mechanism, comprising a friction-disk B' on the shaft B, a bar $z$, pivoted at one end to the frame A, hangers $z'$ $z^2$ on the pivotal bar, a shaft $B^2$, journaled in the said hangers, carrying a drive-pulley $B^4$, a longitudinally-adjustable friction-pulley $B^3$ on the shaft $B^2$, and a lever-actuated eccentric on the frame A, connected with the bar $z$ and operative at will to cause the pulley $B^3$ to engage or release the disk B', substantially as and for the purpose set forth.

ALFRED C. NORTH.

In presence of—
J. W. DYRENFORTH,
M. J. FROST.